United States Patent
Zhou et al.

(10) Patent No.: US 12,273,904 B2
(45) Date of Patent: *Apr. 8, 2025

(54) BEAM READY TIME FOR DOWNLINK CONTROL INFORMATION BASED BEAM ACTIVATION COMMAND

(71) Applicant: QUALCOMM Incorporated, San Diego, CA (US)

(72) Inventors: Yan Zhou, San Diego, CA (US); Tao Luo, San Diego, CA (US); Qian Zhang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,674

(22) Filed: Oct. 25, 2023

(65) Prior Publication Data
US 2024/0147509 A1    May 2, 2024

Related U.S. Application Data

(63) Continuation of application No. 17/115,648, filed on Dec. 8, 2020, now Pat. No. 11,849,473.

(Continued)

(51) Int. Cl.
*H04W 72/53*    (2023.01)
*H04L 5/00*    (2006.01)
(Continued)

(52) U.S. Cl.
CPC ........... *H04W 72/53* (2023.01); *H04L 5/0055* (2013.01); *H04W 24/10* (2013.01);
(Continued)

(58) Field of Classification Search
CPC ............. H04W 72/0493; H04W 24/10; H04W 56/001; H04W 72/042; H04W 72/046;
(Continued)

(56) References Cited

U.S. PATENT DOCUMENTS

2008/0310389 A1   12/2008  Suzuki et al.
2019/0230697 A1    7/2019  Yang et al.
(Continued)

FOREIGN PATENT DOCUMENTS

WO    WO-2019099659 A1    5/2019
WO    WO-2021088042 A1    5/2021

OTHER PUBLICATIONS

Intel Corporation: "Discussion on TCI State Switching Requirements", 3GPP TSG-RAN WG4 Meeting #90bis, 3GPP Draft, R4-1902937, TCI State Switching REQT, 3rd Generation Partnership Project (3GPP), Mobile Competence Centre, 650, Route Des Lucioles, F-06921 Sophia-Antipolis Cedex, France, vol. RAN WG4, No. Xi 'an, China, Apr. 8, 2019-Apr. 12, 2019, Apr. 1, 2019 (Apr. 1, 2019), 6 Pages, XP051713432, Section 2.3, Section 2.

(Continued)

*Primary Examiner* — Kyaw Z Soe
(74) *Attorney, Agent, or Firm* — Harrity & Harrity, LLP

(57) ABSTRACT

Various aspects of the present disclosure generally relate to wireless communication. In some aspects, a user equipment (UE) may determine a new beam ready time that indicates a time at which a beam is to be ready for use in communicating with a base station. The beam may be activated by a downlink control information based beam activation command received by the UE. The UE may communicate with the base station using the beam after the new beam ready time. Numerous other aspects are provided.

20 Claims, 9 Drawing Sheets

Related U.S. Application Data

(60) Provisional application No. 62/947,905, filed on Dec. 13, 2019.

(51) Int. Cl.
    | | |
    |---|---|
    | *H04W 24/10* | (2009.01) |
    | *H04W 56/00* | (2009.01) |
    | *H04W 72/044* | (2023.01) |
    | *H04W 72/23* | (2023.01) |

(52) U.S. Cl.
    CPC ....... *H04W 56/001* (2013.01); *H04W 72/046* (2013.01); *H04W 72/23* (2023.01)

(58) Field of Classification Search
    CPC ..... H04L 5/0055; H04L 5/0053; H04B 7/088; H04B 7/0695; H04B 7/0621
    See application file for complete search history.

(56) References Cited

U.S. PATENT DOCUMENTS

| | | | |
|---|---|---|---|
| 2020/0288479 A1* | 9/2020 | Xi | H04W 72/046 |
| 2021/0185689 A1 | 6/2021 | Zhou et al. | |
| 2022/0006686 A1* | 1/2022 | Chen | H04W 72/1273 |
| 2022/0039124 A1* | 2/2022 | Frenne | H04B 7/0413 |
| 2022/0217705 A1* | 7/2022 | Zhou | H04L 5/0058 |
| 2022/0225338 A1* | 7/2022 | Zhu | H04W 72/23 |
| 2022/0240238 A1* | 7/2022 | Rahman | H04B 7/0695 |

OTHER PUBLICATIONS

Intel Corporation: "Way Forward on TCI State Switching Delay", 3GPP Draft, 3GPP TSG-RAN WG4 Meeting #90, R4-1900112_WF_ON TCI State Switch, 3rd Generation Partnership Project (3GPP), Mobile Competence Centre, 650, Route Des Lucioles, F-06921, Sophia-Antipolis Cedex, France, vol. RAN WG4, No. Athens, GR, Feb. 25, 2019-Mar. 1, 2019, Feb. 15, 2019 (Feb. 15, 2019), XP051604949, 4 Pages, Slides 2 and 3.

Intel Corporation: "Way Forward on TCI State Switching Requirements", 3GPP Draft, 3GPP TSG-RAN WG4 Meeting #90bis, R4-1902938, Way Forward on TCI State Switching, 3rd Generation Partnership Project (3GPP), Mobile Competence Centre, 650, Route Des Lucioles, F-06921, Sophia-Antipolis Cedex, France, vol. RAN WG4. No. Xi 'an, China, Apr. 8, 2019-Apr. 12, 2019, Apr. 1, 2019 (Apr. 1, 2019), XP051713433, 3 Pages, Slides 2, 3.

International Preliminary Report on Patentability—PCT/US2020/064098 The International Bureau of WIPO—Geneva, Switzerland, Jun. 23, 2022.

International Search Report and Written Opinion—PCT/US2020/064098—ISA/EPO—Jun. 28, 2021.

Mediatek Inc: "CR on TCI State Switch (Section 8.10)", 3GPP TSG-RAN4 Meeting #93, 3GPP Draft, R4-1913578, 3rd Generation Partnership Project (3GPP), Mobile Competence Centre, 650, Route Des Lucioles, F-06921 Sophia-Antipolis Cedex, France, vol. RAN WG4, No. Reno, Nevada, USA, Nov. 18, 2019-Nov. 22, 2019, 5 Pages, Nov. 8, 2019 (Nov. 8, 2019), XP051818151, Section 8.10.

Panasonic: "Discussion on PDCCH-Based Power Saving Signal/Channel (PoSS)", 3GPP TSG RAN WG1 #98bis, 3GPP Draft; R1-1910597 PDCCH-Based Power Saving Signal Channel Final, 3rd Generation Partnership Project (3GPP), Mobile Competence Centre, 650, Route Des Lucioles, F-06921 Sophia-Antipolis Cedex, F, vol. RAN WG1, No. Chongqing, China, Oct. 14, 2019-Oct. 20, 2019, 11 Pages, Oct. 4, 2019 (Oct. 4, 2019), XP051808241, p. 5.

Partial International Search Report—PCT/US2020/064098—ISA/EPO—Apr. 6, 2021.

Qualcomm: "Beam Management for NR", 3GPP TSG-RAN WG1 #90bis, R1-1718541, 3rd Generation Partnership Project, Mobile Competence Centre, 650, Route Des Lucioles, F-06921 Sophia-Antipolis Cedex, France, vol. RAN WG1, No. Prague. P.R. Czechia, Oct. 9, 2017-Oct. 13, 2017, Oct. 8, 2017, XP051341723, 3GPP Server Laid Open Date Oct. 3, 2017, 17 Pages, fig. 1+par. 3.1.1, 4., 6., 9, fig. 0-1, Sec. 2.1, Sec. 2.2, Sec. 3, pp. 1-7, the whole document.

Qualcomm Incorporated: "Enhancements on Multi-Beam Operation", 3GPP Draft, 3GPP TSG-RAN WG1 Meeting #98, R1-1911127, Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051808850, 22 Pages, p. 1, p. 4-p. 10 Section 2 Figures 1, 2, Section 3, p. 16-p. 18, Paragraph 7.2.

Qualcomm Incorporated: "RRM Requirements for Active TCI State Switch", 3GPP Draft, 3GPPRAN4#89, R4-1815924, RRM Requirements for Active TCI State Switch, 3rd Generation Partnership Project (3GPP), Mobile Competence Centre, 650, Route Des Lucioles, F-06921, Sophia-Antipolis Cedex, France, vol. RAN WG4, No. Spokane, USA, Nov. 12, 2018-Nov. 16, 2018, Nov. 11, 2018 (Nov. 11, 2018), XP051560170, 2 Pages, Section 1, 2.

VIVO: "Discussion on Beam Measurement, Beam Reporting and Beam Indication", 3GPP TSG RAN WG1 Meeting #90bis, R1-1717472, 3rd Generation Partnership Project, Mobile Competence Centre, 650, Route Des Lucioles, F-06921 Sophia-Antipolis Cedex, FR, vol. RAN WG1, No. Prague, CZ, Oct. 9, 2017-Oct. 13, 2017, Oct. 8, 2017, 12 Pages, XP051340660, sections 1, 2.1.2, 2.2.1, 2.2.2, 2.3.1, 2.3.2. Section 2.2.2, Section 2.2.3, figure 6, Chapters 1 and 2.2.1.

* cited by examiner

BEAM READY TIME FOR DOWNLINK CONTROL INFORMATION BASED BEAM ACTIVATION COMMAND

CROSS-REFERENCE TO RELATED APPLICATION

This Patent Application is a continuation of U.S. Non-Provisional application Ser. No. 17/115,648, filed on Dec. 8, 2020, entitled "NEW BEAM READY TIME FOR DOWNLINK CONTROL INFORMATION BASED BEAM ACTIVATION COMMAND", which claims priority to U.S. Provisional Patent Application No. 62/947,905, filed on Dec. 13, 2019, entitled "NEW BEAM READY TIME FOR DOWNLINK CONTROL INFORMATION BASED BEAM ACTIVATION COMMAND," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a new beam ready time for a downlink control information (DCI) based beam activation command.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a UE, may include determining a new beam ready time that indicates a time at which a beam is to be ready for use in communicating with a base station, wherein the beam is activated by a DCI based downlink/uplink beam activation command received by the UE; and communicating with the base station using the beam after the new beam ready time.

In some aspects, a method of wireless communication, performed by a base station, may include determining a new beam ready time that indicates a time at which a beam is to be ready for use in communicating with a UE; and communicating with the UE using the beam after the new beam ready time and after a DCI based beam activation command, associated with activating the beam, is transmitted to the UE.

In some aspects, a UE for wireless communication may include memory and one or more processors operatively coupled to the memory. The memory and the one or more processors may be configured to determine a new beam ready time that indicates a time at which a beam is to be ready for use in communicating with a base station, wherein the beam is activated by a DCI based downlink/uplink beam activation command received by the UE; and communicate with the base station using the beam after the new beam ready time.

In some aspects, a base station for wireless communication may include memory and one or more processors operatively coupled to the memory. The memory and the one or more processors may be configured to determine a new beam ready time that indicates a time at which a beam is to be ready for use in communicating with a UE; and communicate with the UE using the beam after the new beam ready time and after a DCI based beam activation command, associated with activating the beam, is transmitted to the UE.

In some aspects, a non-transitory computer-readable medium may store one or more instructions for wireless communication. The one or more instructions, when executed by one or more processors of a UE, may cause the one or more processors to: determine a new beam ready time that indicates a time at which a beam is to be ready for use in communicating with a base station, wherein the beam is activated by a DCI based downlink/uplink beam activation command received by the UE; and communicate with the base station using the beam after the new beam ready time.

In some aspects, a non-transitory computer-readable medium may store one or more instructions for wireless communication. The one or more instructions, when executed by one or more processors of a base station, may cause the one or more processors to: determine a new beam ready time that indicates a time at which a beam is to be ready for use in communicating with a UE; and communicate with the UE using the beam after the new beam ready time and after a DCI based beam activation command, associated with activating the beam, is transmitted to the UE.

In some aspects, an apparatus for wireless communication may include means for determining a new beam ready time that indicates a time at which a beam is to be ready for use in communicating with a base station, wherein the beam is activated by a DCI based downlink/uplink beam activation command received by the apparatus; and means for communicating with the base station using the beam after the new beam ready time.

In some aspects, an apparatus for wireless communication may include means for determining a new beam ready time that indicates a time at which a beam is to be ready for use in communicating with a UE; and means for communicating with the UE using the beam after the new beam ready time and after a DCI based beam activation command, associated with activating the beam, is transmitted to the UE.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
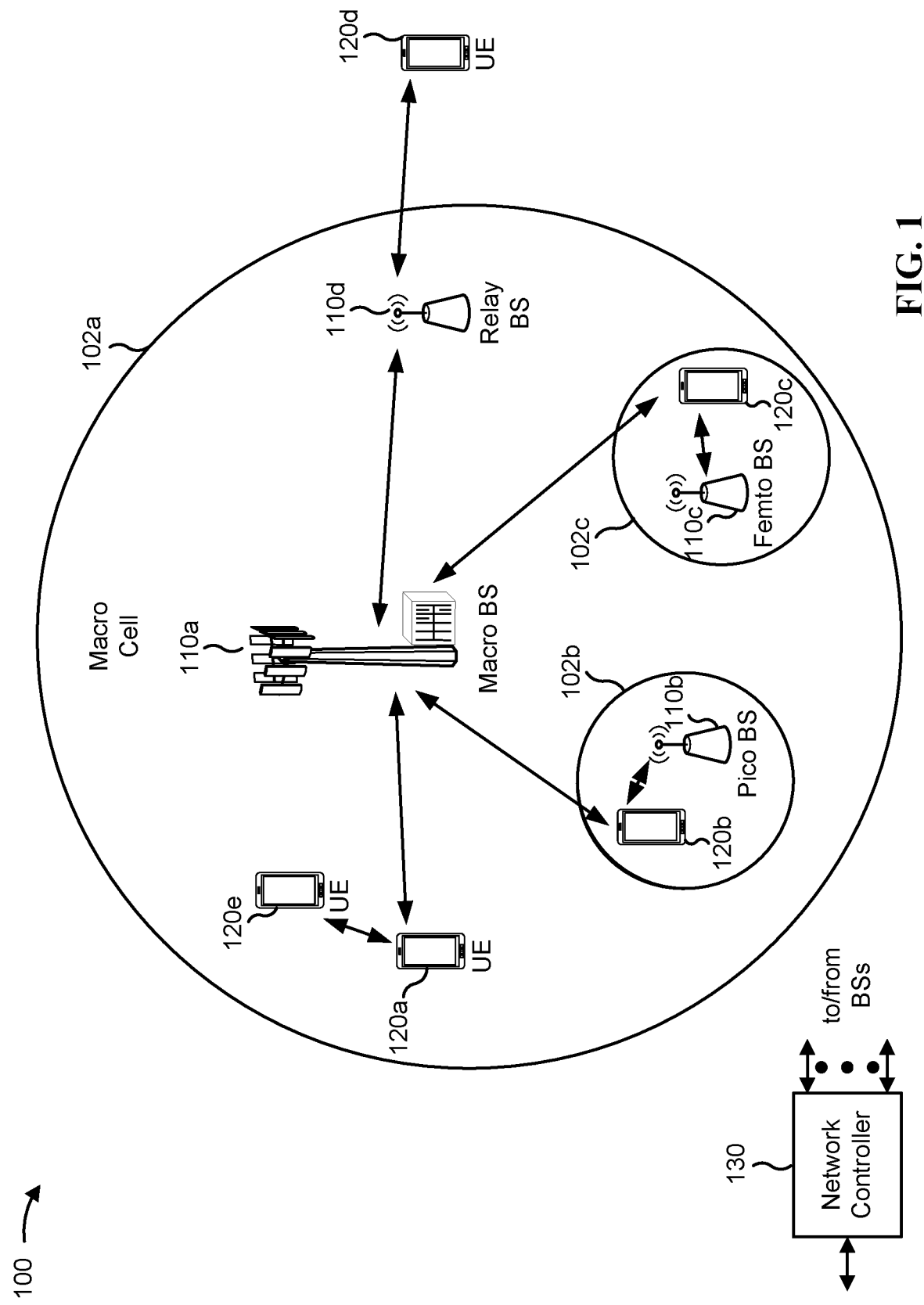
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
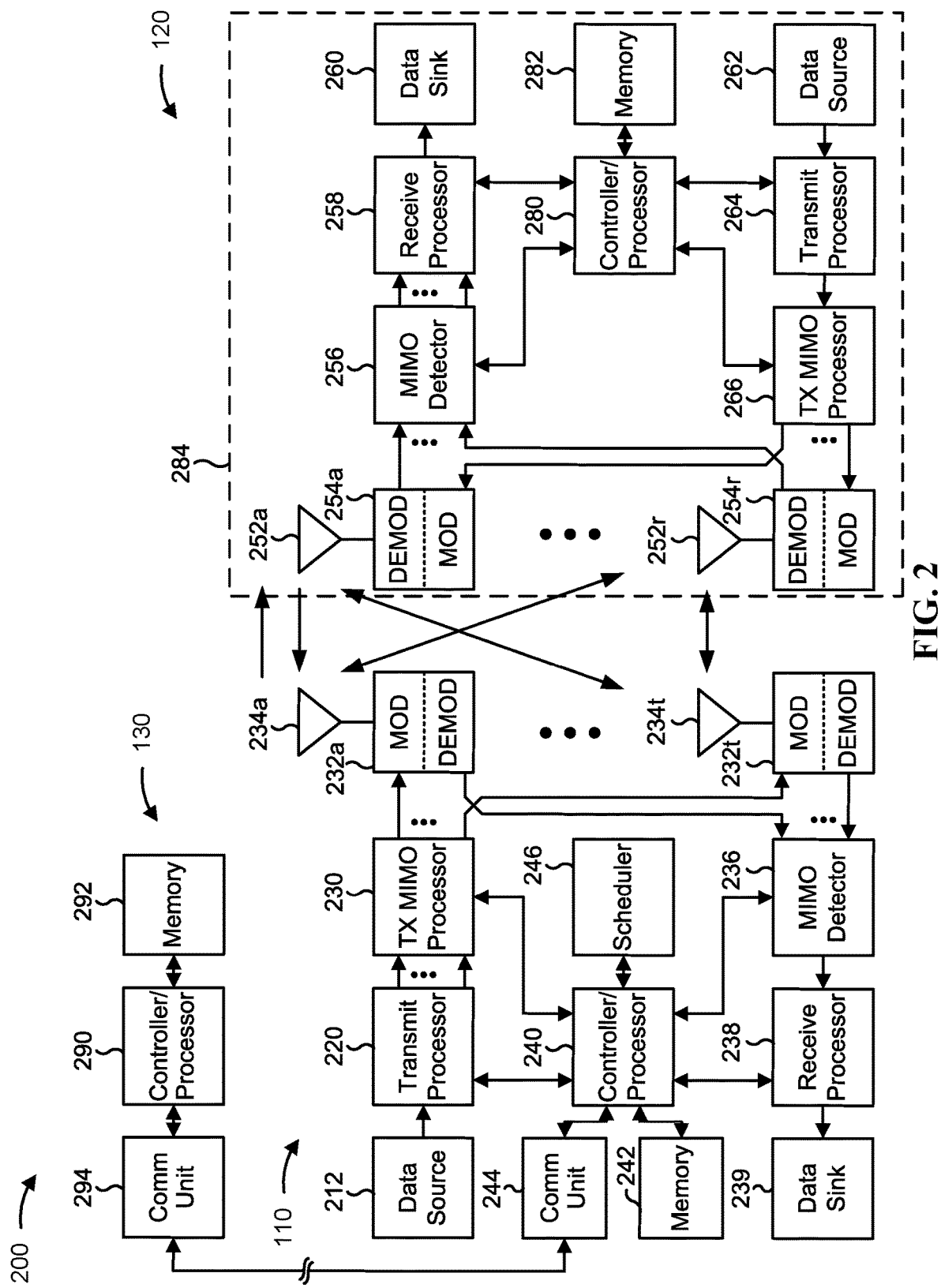
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs)

received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a new beam ready time for a DCI based beam activation command, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for determining a new beam ready time that indicates a time at which a beam is to be ready for use in communicating with base station 110, wherein the beam is activated by a DCI based beam activation command received by UE 120; means for communicating with base station 110 using the beam after the new beam ready time; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a new beam ready time that indicates a time at which a beam is to be ready for use in communicating with UE 120; means for communicating with UE 120 using the beam after the new beam ready time and after a DCI based beam activation command, associated with activating the beam, is transmitted to UE 120; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
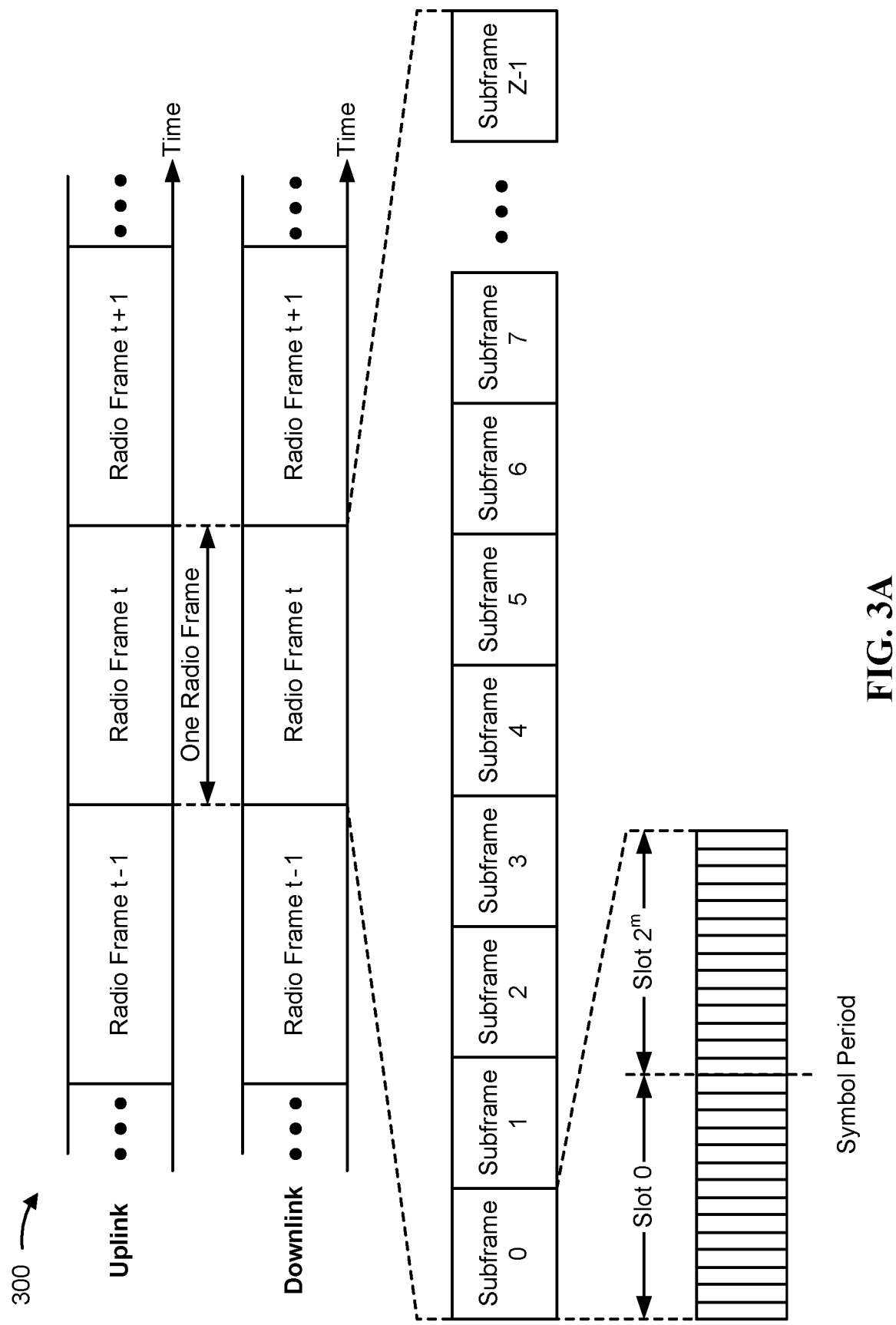
FIG. 3A is a block diagram illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
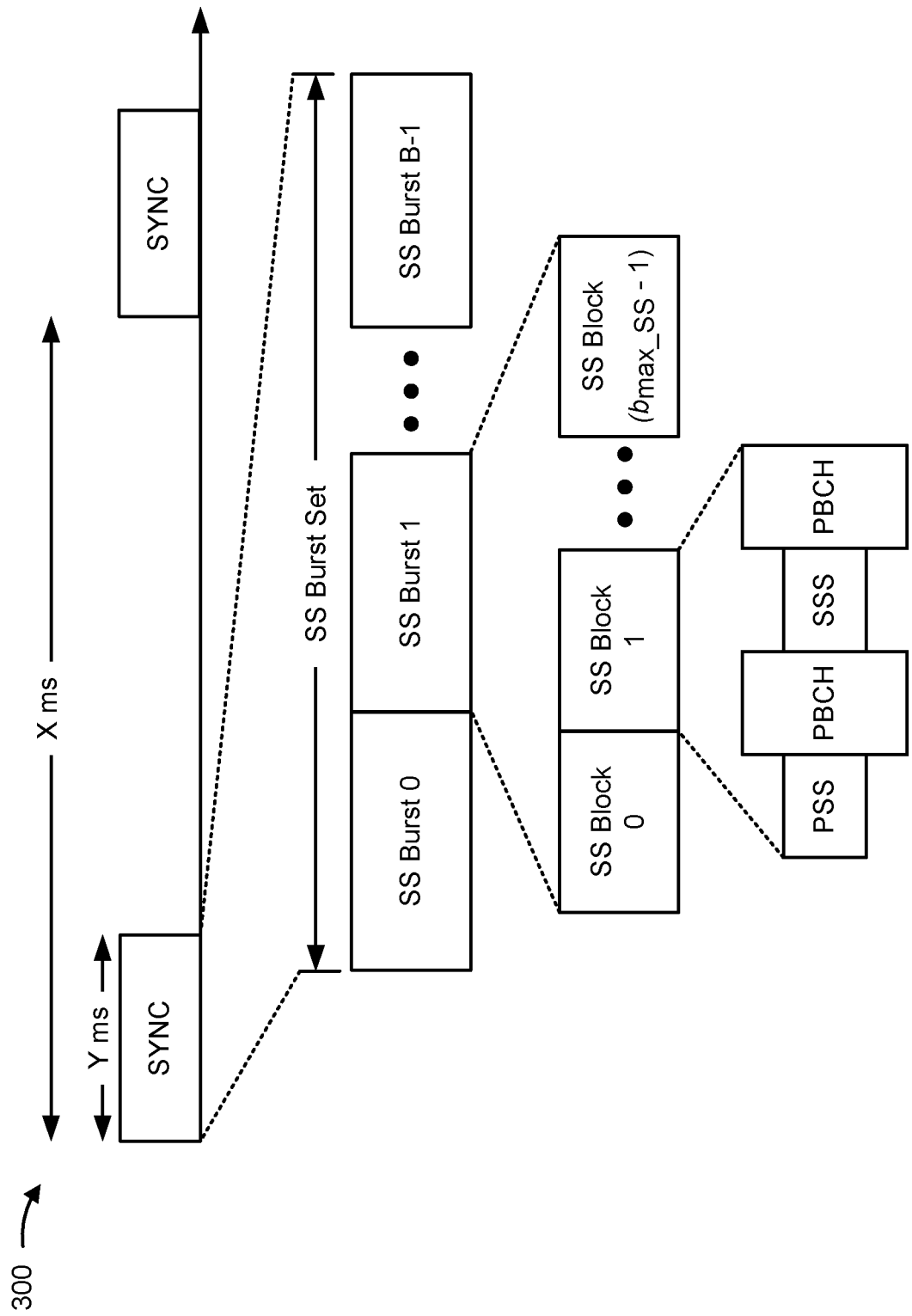
FIG. 3B is a block diagram illustrating an example synchronization communication hierarchy in a wireless communication network, in accordance with various aspects of the present disclosure.

FIG. 3B is a block diagram illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

In some wireless communication systems, a base station may transmit a beam activation command, associated with activating a beam to be used for communications between a UE and the base station, using a medium access control control element (MAC-CE) based beam activation command. However, use of a MAC-CE based beam activation command may introduce latency and/or cause delay to the UE's application of the MAC-CE based beam activation command. For example, use of a MAC-CE based beam activation command may introduce approximately 3 milliseconds (ms) of activation latency in the UE applying the MAC-CE based beam activation command. This delay may be undesirable in a number of scenarios, one example of which is beam management requiring low latency and low overhead to support layer 1 (L1)/layer 2 (L2) intra- or inter-cell mobility.

In some cases, a beam activation command may be DCI based rather than MAC-CE based. DCI based beam activation may be used, for example, for DCI based activation of a physical downlink control channel (PDCCH) transmission configuration indicator (TCI) state, a physical downlink shared channel (PDSCH) TCI state, a channel state information reference signal (CSI-RS) TCI state, a spatial relation for a physical uplink control channel (PUCCH), a spatial relation for a sounding reference signal (SRS), an uplink TCI state for a PUCCH, an uplink TCI state for a physical uplink shared channel (PUSCH), an uplink TCI state for a physical random access channel (PRACH), an uplink TCI state for an SRS, and/or the like. Notably, use of a DCI based beam activation command may reduce latency and delay (as compared to using a MAC-CE for conveying the beam activation command) at the UE when applying the beam activation command.

However, the UE should be enabled to determine a new beam ready time associated with the DCI based beam activation command, which can be defined as a time at which a newly activated beam (i.e., a beam activated by the DCI based beam activation command) is to be ready for use for communicating with the base station (e.g., receiving a communication from the base station or transmitting a communication to the base station).

Some techniques and apparatuses described herein enable a UE to determine a new beam ready time for a beam activated by a DCI based beam activation command. In this way, the UE may determine when a newly activated beam is to be ready for use in association with communicating with a base station, and may then communicate using the beam according to the new beam ready time (i.e., after the new beam ready time). In some aspects, the new beam ready time for a DCI based beam activation may facilitate the reduced delay and latency afforded by the use of DCI based beam activation (e.g., as compared to use of MAC-CE based beam activation).

Figure 4:
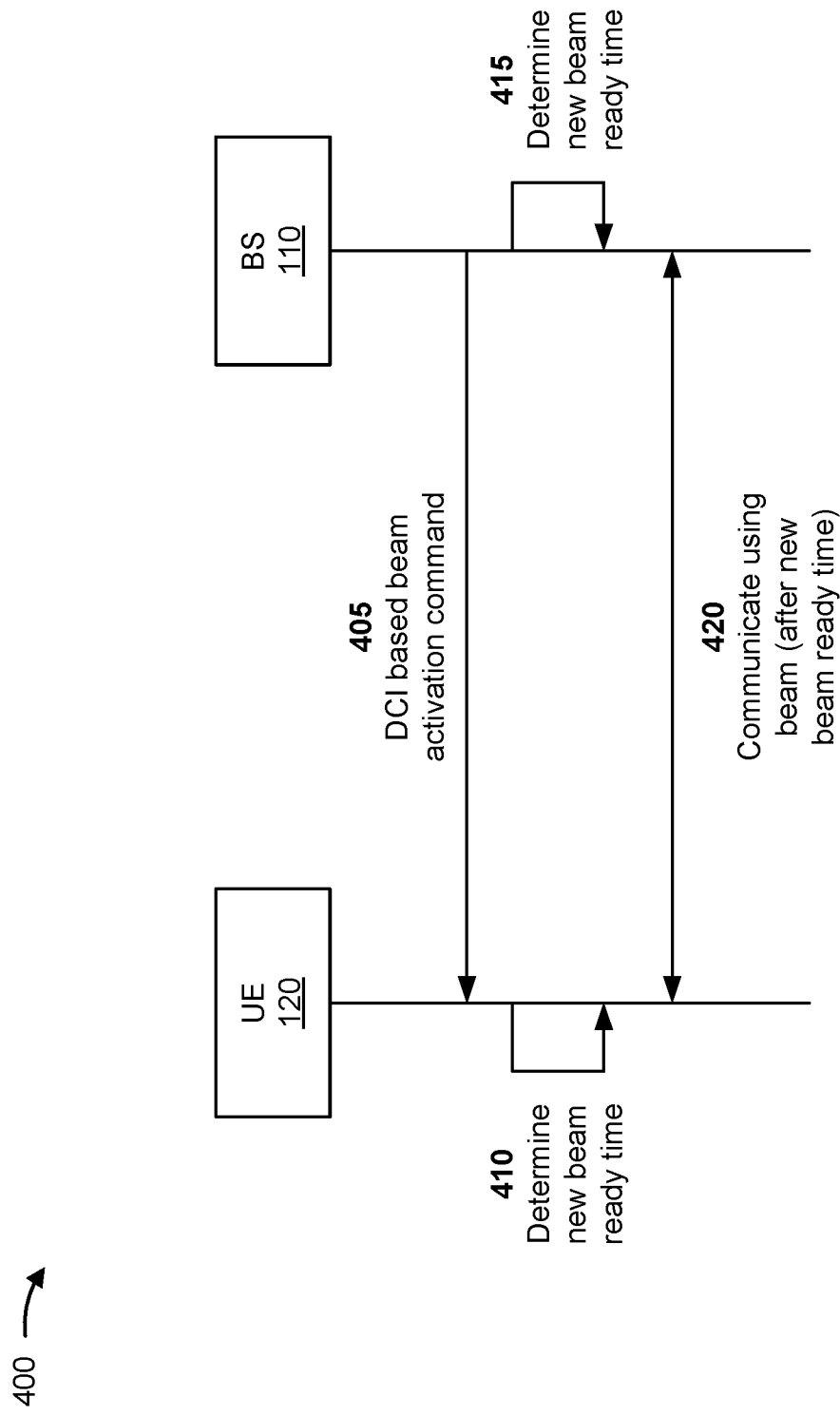
FIG. 4 is a diagram illustrating an example associated with a new beam ready time for a DCI based beam activation command, in accordance with various aspects of the present disclosure.

FIG. 4 is a diagram illustrating an example 400 associated with a new beam ready time for a DCI based beam activation command, in accordance with various aspects of the present disclosure.

As shown in FIG. 4 by reference 405, a base station (e.g., base station 110) may transmit, and the UE 120 may receive, a DCI based beam activation command. As described above, the DCI based beam activation command may be used in association with, for example, activation of a PDCCH TCI state, a PDSCH TCI state, a CSI-RS TCI state, a spatial relation for a PUCCH, a spatial relation for an SRS, an uplink TCI state for a PUCCH, an uplink TCI state for a PUSCH, an uplink TCI state for a PRACH, an uplink TCI state for an SRS, and/or the like. In some aspects, the beam indicated by the DCI based beam activation command may be a new beam to the UE. For example, the DCI based beam activation command may cause the UE to switch from a previous (or current) beam to the new beam for use in communicating with the base station.

As shown by reference number 410, the UE may determine a new beam ready time associated with the beam indicated by the DCI based beam activation command. In some aspects, the UE may determine the new beam ready time based at least in part on receiving the DCI based beam activation command. In some aspects, the new beam ready time may indicate a time at which the beam is to be ready for use in communicating with the base station. For example, the new beam ready time may indicate an interval after which the indicated beam is to be ready for use in communicating with the base station.

Similarly, as shown by reference 415, the base station may determine the new beam ready time associated with the beam indicated by the DCI based beam activation command. In some aspects, the base station may determine the new beam ready time based at least in part on transmitting the DCI based beam activation command. Alternatively, the base station may determine the new beam ready time prior to transmitting the DCI based beam activation command, in some aspects.

In some aspects, the UE and/or the base station may determine the new beam ready time based at least in part on a determination of whether a beam configuration, associated with the beam, is known to the UE or not known to the UE. Here, the beam configuration may be transmission configuration information (TCI) state associated with the beam (e.g., when the beam is a beam to be used for downlink communications) or a spatial relation associated with the beam (e.g., when the beam is a beam to be used for uplink communications).

In some aspects, the beam configuration may be determined to be known to the UE when (1) an activation command for the beam configuration has been received (by the UE) within a particular window of time, and (2) when a quasi co-location (QCL), spatial reference signal, or SSB QCL source, associated with the beam configuration, has been detected or reported within the particular window of time. That is, in some aspects, a beam configuration may be known to the UE when the UE has received an activation command for the new TCI state or spatial relation in a particular window of time, and a corresponding QCL/spatial reference signal and/or its SSB QCL source has been detected/reported in the particular time window.

In some aspects, the beam configuration may be determined to be known to the UE when one or more other conditions are satisfied. For example, in some aspects, the beam configuration may be determined to be known to the UE when (1) a switch command, associated with the beam configuration, is received during a particular period of time (e.g., 1280 ms) from a last transmission of a reference signal resource for beam reporting or measurement for the beam configuration, (2) at least one measurement report for the beam configuration has been transmitted, (3) the beam configuration is detectable during a switching period associated with the beam configuration, (4) an SSB, associated with the beam configuration, is detectable during the switching period associated with the beam configuration, and (5) a signal-to-noise ratio (SNR), associated with the beam configuration, satisfies a threshold (e.g., $\geq -3$ decibels (dB)). In this example, the beam configuration is not known (i.e., is unknown) to the UE when any one of conditions (1) through (5) are not met.

In some aspects, the UE and/or the base station may determine the new beam ready time based at least in part on one or more parameters. For example, the one or more parameters may include a timing between a downlink transmission and an acknowledgment associated with the downlink transmission (e.g., T_HARQ). As another example, the one or more parameters may include a time to a first SSB transmission after a MAC-CE command is decoded by the UE (e.g., T_first-SSB). As another example, the one or more parameters may include an SSB processing time (e.g., T_SSB-proc, which may be 2 ms). As another example, the one or more parameters may include a value that depends on whether a TCI state associated with the beam is included in an active TCI state list (e.g., T_Ok, where a value of 1 is used when the TCI state is not in the active TCI state list, and a value of 0 is used otherwise). As another example, the one or more parameters may include a time for a layer 1 reference signal received power (RSRP) measurement for beam refinement (e.g., T_L1-RSRP). As another example, the one or more parameters may include a value that depends on whether a layer 1 RSRP measurement is based on a channel state information reference signal or an SSB (e.g., T_Ouk, where a value of 1 is used for CSI-RS based L1-RSRP and a value of 0 is used for SSB based L1-RSRP). As another example, the one or more parameters may include a numerology of a component associated with the DCI based beam activation command. As another example, the one or more parameters may include a numerology of a component carrier associated with the beam. In some aspects, the new beam ready time may be determined based at least in part on a combination of two or more of the above parameters and/or based at least in part on one or more other parameters.

In some aspects, the UE and/or the base station may be configured such that the new beam ready time is measured from an end of the DCI based beam activation command (e.g., the new beam ready time can be defined as Y (Y>0) ms from the end of the DCI based beam activation command).

In some aspects, when the new beam ready time is measured from the end of the DCI based beam activation command and when PDCCH repetition is used in association with communicating the DCI based beam activation command, the new beam ready time may be measured from a particular PDCCH repetition. Here, the particular PDCCH repetition may be a first transmission of a PDCCH including the DCI based beam activation command, a last transmission of the PDCCH including the DCI based beam activation command, or a transmission of the PDCCH including the DCI based beam activation command that is between the first transmission of the PDCCH and the last transmission of the PDCCH. In some aspects, the particular PDCCH repetition from which the new beam ready time is measured can be indicated (e.g., by the base station to the UE) via radio resource control (RRC) signaling, a MAC-CE, DCI, and/or the like.

In some aspects, the UE and/or the base station may be configured such that the new beam ready time is measured from an end of an acknowledgment of the DCI based beam activation command.

In some aspects, when the new beam ready time is measured from the end of the acknowledgment of the DCI based beam activation command and when uplink repetition is used in association with communicating the acknowledgment of the DCI based beam activation command, the new beam ready time may be measured from a particular uplink repetition. Here, the particular uplink repetition may be a first transmission of an uplink communication (e.g., a PUCCH communication or a PUSCH communication) including the acknowledgment of the DCI based beam activation command, a last transmission of the uplink communication including the acknowledgment of the DCI based beam activation command, or a transmission of an uplink communication including the acknowledgment of the DCI based beam activation command that is between the first transmission of the uplink communication and the last transmission of the uplink communication. In some aspects, the particular uplink repetition from which the new beam ready time is measured may be indicated (e.g., by the base station to the UE) via RRC signaling, a MAC-CE, DCI, and/or the like.

The following provides a particular example of a new beam ready time for a DCI based PDCCH TCI state activation with a known TCI state (e.g., a TCI state that is known to the UE). In this example, upon receiving a DCI based beam activation command at slot n, the UE may be able to receive a PDCCH with the TCI state of the serving cell on which a TCI state switch occurs no later than a time determined from computing slot $n+T\_HARQ+X$ ms$+T\_Ok*$ $(T\_first\text{-}SSB+T\_SSB\text{-}proc)$. In this example, the UE may be able to receive on the previous TCI state until slot $n+T\_HARQ+X$ ms$+T\_Ok*(T\_first\text{-}SSB)$. Here, X may be a fixed (e.g., preconfigured) value, or may be expressed in terms of a number of symbols whose number and numerology may depend on a numerology of a component carrier with activation DCI, a component carrier of the activated beam, or both.

The following provides a particular example of a new beam ready time for a DCI based PDCCH TCI state activation with an unknown TCI state (e.g., a TCI state that is not known to the UE). In this example, upon receiving a DCI based beam activation command at slot n, the UE may be able to receive a PDCCH with the TCI state of the serving cell on which a TCI state switch occurs no later than a time determined by computing slot $n+T\_HARQ+X$ ms$+T\_L1\text{-}RSRP+T\_Ouk*(T\_first\text{-}SSB+T\_SSB\text{-}proc)$. In this example, the UE may be able to receive on the previous TCI state until slot $n+T\_HARQ+X\_ms+T\_L1\text{-}RSRP+T\_Ok*$ $(T\_first\text{-}SSB)$. Here, X may be a fixed (e.g., preconfigured) value, or may be expressed in terms of a number of symbols whose number and numerology may depend on a numerology of a component carrier with activation DCI, a component carrier of the activated beam, or both.

As shown by reference number 420, the UE and the base station may communicate using the beam after the new beam ready time. For example, after determining the new beam ready time as described above, the UE and the base station may communicate (e.g., the UE may transmit, and the base station may receive, an uplink communication; the base station may transmit, the UE may receive, a downlink communication) using the beam after the new beam ready time has passed (e.g., as measured from the end of the DCI based beam activation command, as measured from the end of the acknowledgment of the DCI based beam activation command).

As indicated above, FIG. 4 is provided as an example. Other examples may differ from what is described with respect to FIG. 4.

Figure 5:
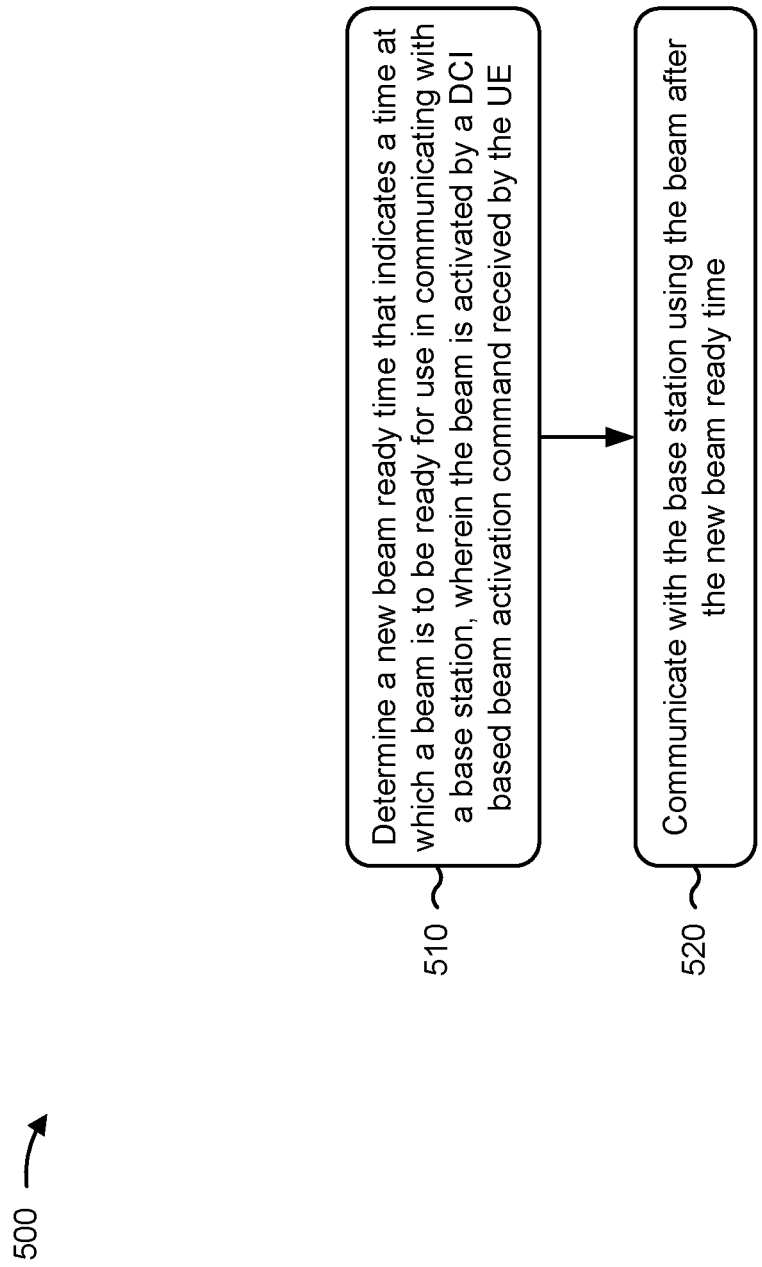
FIG. 5 is a diagram illustrating an example process performed, for example, by a user equipment, in accordance with various aspects of the present disclosure.

FIG. 5 is a diagram illustrating an example process 500 performed, for example, by UE, in accordance with various aspects of the present disclosure. Example process 500 is an example where the UE (e.g., UE 120 and/or the like) performs operations associated with a new beam ready time for a DCI based beam activation command.

As shown in FIG. 5, in some aspects, process 500 may include determining a new beam ready time that indicates a time at which a beam is to be ready for use in communicating with a base station (block 510). For example, the user equipment (UE) (e.g., using receive processor 258, transmit processor 264, controller/processor 280, memory 282, and/or the like) may determine a new beam ready time that indicates a time at which a beam is to be ready for use in communicating with a base station, as described above. In some aspects, the beam is activated by a DCI based beam activation command received by the UE.

As further shown in FIG. 5, in some aspects, process 500 may include communicating with the base station using the beam after the new beam ready time (block 520). For example, the UE (e.g., using receive processor 258, transmit processor 264, controller/processor 280, memory 282, and/or the like) may communicate with the base station using the beam after the new beam ready time, as described above.

Process 500 may include additional aspects, such as any single aspect or any combination of aspects described below and/or in connection with one or more other processes described elsewhere herein.

In a first aspect, the new beam ready time is determined based at least in part on a determination of whether a beam configuration, associated with the beam, is known to the UE or not known to the UE, wherein the beam configuration is a transmission configuration information state associated with the beam or a spatial relation associated with the beam.

In a second aspect, alone or in combination with the first aspect, the beam configuration is determined to be known to the UE when an activation command for the beam configuration has been received within a particular window of time, and a QCL, spatial reference signal, or synchronization signal block QCL source, associated with the beam configuration, has been detected or reported within the particular window of time.

In a third aspect, alone or in combination with one or more of the first and second aspects, the beam configuration is determined to be known to the UE when a switch command, associated with the beam configuration, is received during a particular period of time from a last transmission of a reference signal resource for beam reporting or measurement for the beam configuration, at least one measurement report for the beam configuration has been transmitted, the beam configuration is detectable during a switching period associated with the beam configuration, a synchronization signal block, associated with the beam configuration, is detectable during the switching period associated with the beam configuration, and a signal-to-noise ratio, associated with the beam configuration, satisfies a threshold.

In a fourth aspect, alone or in combination with one or more of the first through third aspects, the new beam ready time is determined based at least in part on at least one of a timing between a downlink transmission and an acknowledgment associated with the downlink transmission, a time to a first SSB transmission after a MAC-CE command is decoded by the UE, an SSB processing time, whether a TCI state associated with the beam is included in an active TCI state list, a time for a layer 1 RSRP measurement for beam refinement, whether a layer 1 RSRP measurement is based on a channel state information reference signal or an SSB, a numerology of a component associated with the DCI based beam activation command, or a numerology of a component carrier associated with the beam.

In a fifth aspect, alone or in combination with one or more of the first through fourth aspects, the new beam ready time is measured from an end of the DCI based beam activation command.

In a sixth aspect, alone or in combination with one or more of the first through fifth aspects, when PDCCH repetition is used in association with communicating the DCI based beam activation command, the new beam ready time is measured from a particular PDCCH repetition.

In a seventh aspect, alone or in combination with one or more of the first through sixth aspects, the particular PDCCH repetition is a first transmission of a PDCCH including the DCI based beam activation command.

In an eighth aspect, alone or in combination with one or more of the first through seventh aspects, the particular PDCCH repetition is a last transmission of a PDCCH including the DCI based beam activation command.

In a ninth aspect, alone or in combination with one or more of the first through eighth aspects, the particular PDCCH repetition is a transmission of a PDCCH including the DCI based beam activation command that is between a first transmission of the PDCCH and a last transmission of the PDCCH.

In a tenth aspect, alone or in combination with one or more of the first through ninth aspects, the particular PDCCH repetition from which the new beam ready time is measured is indicated via at least one of radio resource control signaling, a MAC-CE, or DCI.

In an eleventh aspect, alone or in connection with one or more of the first through tenth aspects, the new beam ready time is measured from an end of an acknowledgment of the DCI based beam activation command.

In a twelfth aspect, alone or in combination with one or more of the first through eleventh aspects, when uplink repetition is used in association with communicating the acknowledgment of the DCI based beam activation command, the new beam ready time is measured from a particular uplink repetition.

In a thirteenth aspect, alone or in combination with one or more of the first through twelfth aspects, the particular uplink repetition is a first transmission of an uplink communication including the acknowledgment of the DCI based beam activation command.

In a fourteenth aspect, alone or in combination with one or more of the first through thirteenth aspects, the particular uplink repetition is a last transmission of an uplink communication including the acknowledgment of the DCI based beam activation command.

In a fifteenth aspect, alone or in combination with one or more of the first through fourteenth aspects, the particular uplink repetition is a transmission of an uplink communication including the acknowledgment of the DCI based beam activation command that is between a first transmission of the uplink communication and a last transmission of the uplink communication.

In a sixteenth aspect, alone or in combination with one or more of the first through fifteenth aspects, the particular uplink repetition from which the new beam ready time is measured is indicated via at least one of radio resource control signaling, a MAC-CE, or DCI.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
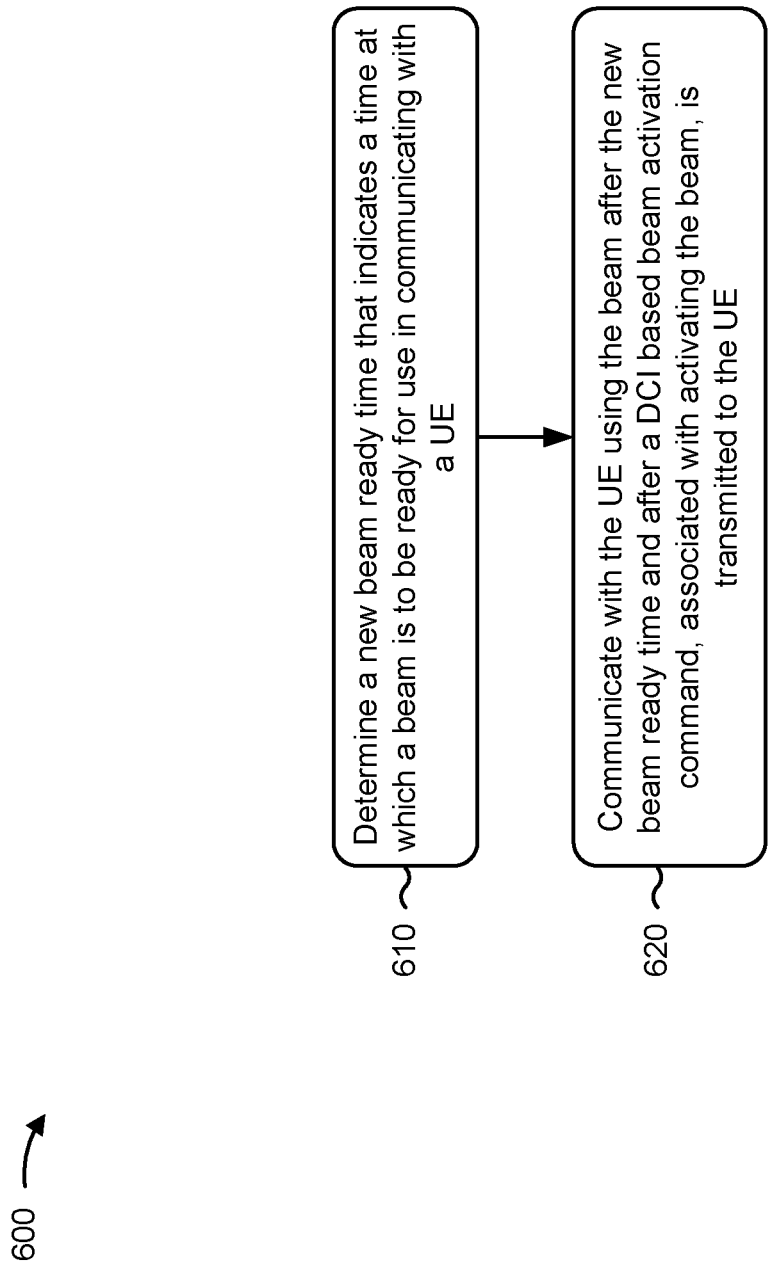
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where the base station (e.g., base station 110 and/or the like) performs operations associated with a new beam ready time for a DCI based beam activation command.

As shown in FIG. 6, in some aspects, process 600 may include determining a new beam ready time that indicates a time at which a beam is to be ready for use in communicating with a UE (block 610). For example, the base station (e.g., using transmit processor 220, receive processor 238, controller/processor 240, memory 242, and/or the like) may determine a new beam ready time that indicates a time at which a beam is to be ready for use in communicating with a UE (e.g., UE 120), as described above.

As further shown in FIG. 6, in some aspects, process 600 may include communicating with the UE using the beam after the new beam ready time and after a DCI based beam activation command, associated with activating the beam, is transmitted to the UE (block 620). For example, the base station (e.g., using transmit processor 220, receive processor 238, controller/processor 240, memory 242, and/or the like) may communicate with the UE using the beam after the new beam ready time and after a DCI based beam activation command, associated with activating the beam, is transmitted to the UE, as described above.

Process 600 may include additional aspects, such as any single aspect or any combination of aspects described below and/or in connection with one or more other processes described elsewhere herein.

In a first aspect, the new beam ready time is determined based at least in part on a determination of whether a beam configuration, associated with the beam, is known to the UE or not known to the UE, where the beam configuration is a transmission configuration information state associated with the beam or a spatial relation associated with the beam.

In a second aspect, alone or in combination with the first aspect, the beam configuration is determined to be known to the UE when an activation command for the beam configuration has been received by the UE within a particular window of time, and a QCL, spatial reference signal, or synchronization signal block QCL source, associated with the beam configuration, has been detected or reported by the UE within the particular window of time.

In a third aspect, alone or in combination with one or more of the first and second aspects, the beam configuration is determined to be known to the UE when a switch command, associated with the beam configuration, is received by the UE during a particular period of time from a last transmission of a reference signal resource for beam reporting or measurement for the beam configuration, at least one measurement report for the beam configuration has been transmitted by the UE, the beam configuration is detectable by the UE during a switching period associated with the beam configuration, a synchronization signal block, associated with the beam configuration, is detectable by the UE during the switching period associated with the beam configuration, and a signal-to-noise ratio, associated with the beam configuration, satisfies a threshold.

In a fourth aspect, alone or in combination with one or more of the first through third aspects, the new beam ready time is determined based at least in part on at least one of a timing between a downlink transmission and an acknowledgment associated with the downlink transmission, a time to a first SSB transmission after a MAC-CE command is decoded by the UE, an SSB processing time, whether a TCI state associated with the beam is included in an active TCI state list, a time for a layer 1 RSRP measurement for beam refinement, whether a layer 1 RSRP measurement is based on a channel state information reference signal or an SSB, a numerology of a component associated with the DCI based beam activation command, or a numerology of a component carrier associated with the beam.

In a fifth aspect, alone or in combination with one or more of the first through fourth aspects, the new beam ready time is measured from an end of the DCI based beam activation command.

In a sixth aspect, alone or in combination with one or more of the first through fifth aspects, when PDCCH repetition is used in association with communicating the DCI based beam activation command, the new beam ready time is measured from a particular PDCCH repetition.

In a seventh aspect, alone or in combination with one or more of the first through sixth aspects, the particular PDCCH repetition is a first transmission of a PDCCH including the DCI based beam activation command.

In an eighth aspect, alone or in combination with one or more of the first through seventh aspects, the particular PDCCH repetition is a last transmission of a PDCCH including the DCI based beam activation command.

In a ninth aspect, alone or in combination with one or more of the first through eighth aspects, the particular PDCCH repetition is a transmission of a PDCCH including the DCI based beam activation command that is between a first transmission of the PDCCH and a last transmission of the PDCCH.

In a tenth aspect, alone or in combination with one or more of the first through ninth aspects, the particular PDCCH repetition from which the new beam ready time is measured is indicated via at least one of radio resource control signaling, a MAC-CE, or DCI.

In an eleventh aspect, alone or in combination with one or more of the first through tenth aspects, the new beam ready time is measured from an end of an acknowledgment of the DCI based beam activation command.

In a twelfth aspect, alone or in combination with one or more of the first through eleventh aspects, when uplink repetition is used in association with communicating the acknowledgment of the DCI based beam activation command, the new beam ready time is measured from a particular uplink repetition.

In a thirteenth aspect, alone or in combination with one or more of the first through twelfth aspects, the particular uplink repetition is a first transmission of an uplink communication including the acknowledgment of the DCI based beam activation command.

In a fourteenth aspect, alone or in combination with one or more of the first through thirteenth aspects, the particular uplink repetition is a last transmission of an uplink communication including the acknowledgment of the DCI based beam activation command.

In a fifteenth aspect, alone or in combination with one or more of the first through fourteenth aspects, the particular uplink repetition is a transmission of an uplink communication including the acknowledgment of the DCI based beam activation command that is between a first transmission of the uplink communication and a last transmission of the uplink communication.

In a sixteenth aspect, alone or in combination with one or more of the first through fifteenth aspects, the particular uplink repetition from which the new beam ready time is measured is indicated via at least one of radio resource control signaling, a MAC-CE, or DCI.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
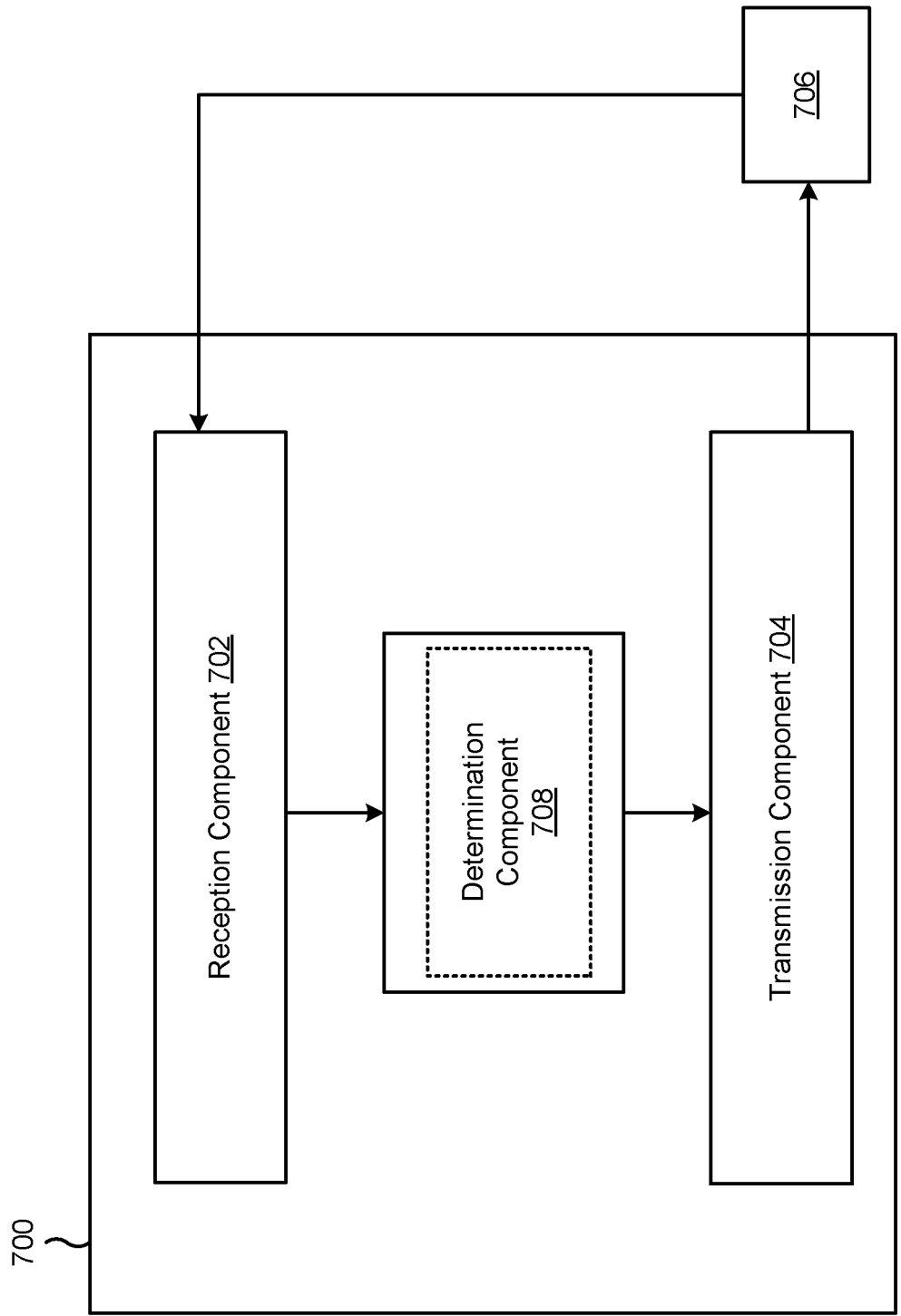
FIGS. 7 and 8 are block diagrams of example apparatuses for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a determination component 708, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The determination component 708 may determine a new beam ready time that indicates a time at which a beam is to be ready for use in communicating with a base station wherein the beam is activated by a DCI based beam activation command received by the UE. The reception component 602 and/or the transmission component 604 may communicate with the base station using the beam after the new beam ready time.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
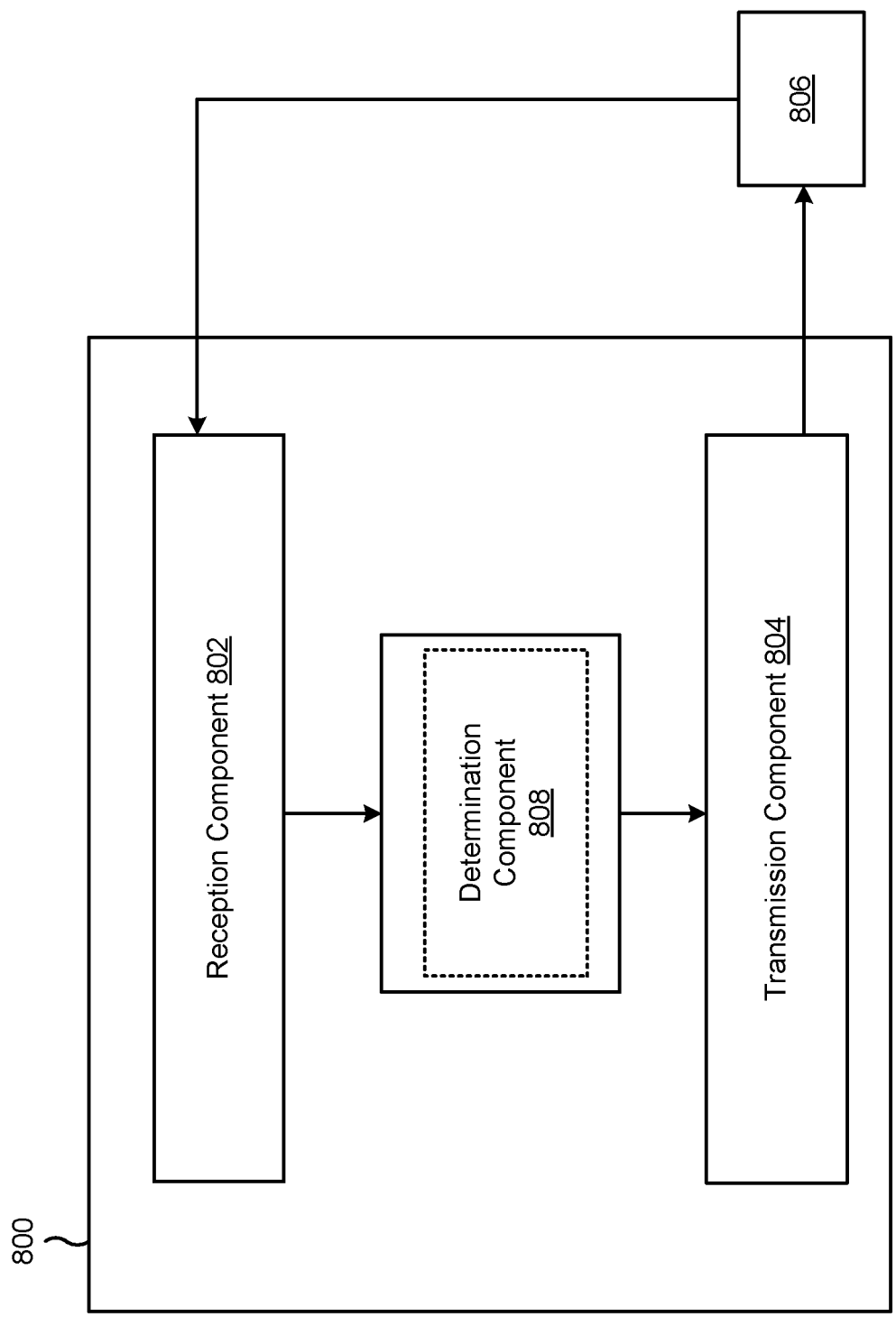

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The determination component 808 may determine a new beam ready time that indicates a time at which a beam is to be ready for use in communicating with a UE. The reception component 802 and/or the transmission component 804 may communicate with the UE using the beam after the new beam ready time and after a DCI based beam activation command, associated with activating the beam, is transmitted to the UE.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of aspects of the present disclosure:

Aspect 1: A method of wireless communication performed by a user equipment (UE), comprising: determining a new beam ready time that indicates a time at which a beam is to be ready for use in communicating with a base station, wherein the beam is activated by a downlink control information (DCI) based beam activation command received by the UE; and communicating with the base station using the beam after the new beam ready time.

Aspect 2: The method of aspect 1, wherein the new beam ready time is determined based at least in part on a determination of whether a beam configuration, associated with the beam, is known to the UE or not known to the UE, wherein the beam configuration is a transmission configuration information state associated with the beam or a spatial relation associated with the beam.

Aspect 3: The method of aspect 2, wherein the beam configuration is determined to be known to the UE when: an activation command for the beam configuration has been received within a particular window of time, and a quasi co-location (QCL), spatial reference signal, or synchronization signal block QCL source, associated with the beam configuration, has been detected or reported within the particular window of time.

Aspect 4: The method of aspect 2, wherein the beam configuration is determined to be known to the UE when: a switch command, associated with the beam configuration, is received during a particular period of time from a last transmission of a reference signal resource for beam reporting or measurement for the beam configuration, at least one measurement report for the beam configuration has been transmitted, the beam configuration is detectable during a switching period associated with the beam configuration, a synchronization signal block, associated with the beam configuration, is detectable during the switching period associated with the beam configuration, and a signal-to-noise ratio, associated with the beam configuration, satisfies a threshold.

Aspect 5: The method of any of aspects 1-4, wherein the new beam ready time is determined based at least in part on at least one of: a timing between a downlink transmission and an acknowledgment associated with the downlink transmission, a time to a first synchronization signal block (SSB) transmission after a medium access control control element command is decoded by the UE, an SSB processing time, whether a transmission configuration indicator (TCI) state, associated with the beam, is included in an active TCI state list, a time for a layer 1 reference signal received power (RSRP) measurement for beam refinement, whether a layer 1 RSRP measurement is based on a channel state information reference signal or an SSB, a numerology of a component associated with the DCI based beam activation command, or a numerology of a component carrier associated with the beam.

Aspect 6: The method of any of aspects 1-5, wherein the new beam ready time is measured from an end of the DCI based beam activation command.

Aspect 7: The method of aspect 6, wherein, when physical downlink control channel (PDCCH) repetition is used in association with communicating the DCI based beam activation command, the new beam ready time is measured from a particular PDCCH repetition.

Aspect 8: The method of aspect 7, wherein the particular PDCCH repetition is a first transmission of a PDCCH including the DCI based beam activation command.

Aspect 9: The method of aspect 7, wherein the particular PDCCH repetition is a last transmission of a PDCCH including the DCI based beam activation command.

Aspect 10: The method of aspect 7, wherein the particular PDCCH repetition is a transmission of a PDCCH including the DCI based beam activation command that is between a first transmission of the PDCCH and a last transmission of the PDCCH.

Aspect 11: The method of aspect 7, wherein the particular PDCCH repetition from which the new beam ready time is measured is indicated via at least one of radio resource control signaling, a medium access control control element, or DCI.

Aspect 12: The method of any of aspects 1-11, wherein the new beam ready time is measured from an end of an acknowledgment of the DCI based beam activation command.

Aspect 13: The method of aspect 12, wherein, when uplink repetition is used in association with communicating the acknowledgment of the DCI based beam activation command, the new beam ready time is measured from a particular uplink repetition.

Aspect 14: The method of aspect 13, wherein the particular uplink repetition is a first transmission of an uplink communication including the acknowledgment of the DCI based beam activation command.

Aspect 15: The method of aspect 13, wherein the particular uplink repetition is a last transmission of an uplink communication including the acknowledgment of the DCI based beam activation command.

Aspect 16: The method of aspect 13, wherein the particular uplink repetition is a transmission of an uplink communication including the acknowledgment of the DCI based beam activation command that is between a first transmission of the uplink communication and a last transmission of the uplink communication.

Aspect 17: The method of aspect 13, wherein the particular uplink repetition from which the new beam ready time is measured is indicated via at least one of radio resource control signaling, a medium access control control element, or DCI.

Aspect 18: A method of wireless communication performed by a base station, comprising: determining a new beam ready time that indicates a time at which a beam is to be ready for use in communicating with a user equipment (UE); and communicating with the UE using the beam after the new beam ready time and after a downlink control information (DCI) based beam activation command, associated with activating the beam, is transmitted to the UE.

Aspect 19: The method of aspect 18, wherein the new beam ready time is determined based at least in part on a determination of whether a beam configuration, associated with the beam, is known to the UE or not known to the UE, wherein the beam configuration is a transmission configuration information state associated with the beam or a spatial relation associated with the beam.

Aspect 20: The method of aspect 19, wherein the beam configuration is determined to be known to the UE when: an activation command for the beam configuration has been received by the UE within a particular window of time, and a quasi co-location (QCL), spatial reference signal, or synchronization signal block QCL source, associated with the beam configuration, has been detected or reported by the UE within the particular window of time.

Aspect 21: The method of aspect 19, wherein the beam configuration is determined to be known to the UE when: a switch command, associated with the beam configuration, is received by the UE during a particular period of time from a last transmission of a reference signal resource for beam reporting or measurement for the beam configuration, at least one measurement report for the beam configuration has been transmitted by the UE, the beam configuration is detectable by the UE during a switching period associated with the beam configuration, a synchronization signal block, associated with the beam configuration, is detectable by the UE during the switching period associated with the beam configuration, and a signal-to-noise ratio, associated with the beam configuration, satisfies a threshold.

Aspect 22: The method of any of aspects 18-21, wherein the new beam ready time is determined based at least in part on at least one of: a timing between a downlink transmission and an acknowledgment associated with the downlink transmission, a time to a first synchronization signal block (SSB) transmission after a medium access control control element command is decoded by the UE, an SSB processing time, whether a transmission configuration indicator (TCI) state, associated with the beam, is included in an active TCI state list, a time for a layer 1 reference signal received power (RSRP) measurement for beam refinement, whether a layer 1 RSRP measurement is based on a channel state information reference signal or an SSB, a numerology of a component associated with the DCI based beam activation command, or a numerology of a component carrier associated with the beam.

Aspect 23: The method of any of aspects 18-22, wherein the new beam ready time is measured from an end of the DCI based beam activation command.

Aspect 24: The method of aspect 23, wherein, when physical downlink control channel (PDCCH) repetition is used in association with communicating the DCI based beam activation command, the new beam ready time is measured from a particular PDCCH repetition.

Aspect 25: The method of aspect 24, wherein the particular PDCCH repetition is a first transmission of a PDCCH including the DCI based beam activation command.

Aspect 26: The method of aspect 24, wherein the particular PDCCH repetition is a last transmission of a PDCCH including the DCI based beam activation command.

Aspect 27: The method of aspect 24, wherein the particular PDCCH repetition is a transmission of a PDCCH including the DCI based beam activation command that is between a first transmission of the PDCCH and a last transmission of the PDCCH.

Aspect 28: The method of aspect 24, wherein the particular PDCCH repetition from which the new beam ready time is measured is indicated via at least one of radio resource control signaling, a medium access control control element, or DCI.

Aspect 29: The method of any of aspects 18-28, wherein the new beam ready time is measured from an end of an acknowledgment of the DCI based beam activation command.

Aspect 30: The method of aspect 29, wherein, when uplink repetition is used in association with communicating the acknowledgment of the DCI based beam activation command, the new beam ready time is measured from a particular uplink repetition.

Aspect 31: The method of aspect 30, wherein the particular uplink repetition is a first transmission of an uplink communication including the acknowledgment of the DCI based beam activation command.

Aspect 32: The method of aspect 30, wherein the particular uplink repetition is a last transmission of an uplink communication including the acknowledgment of the DCI based beam activation command.

Aspect 33: The method of aspect 30, wherein the particular uplink repetition is a transmission of an uplink communication including the acknowledgment of the DCI based beam activation command that is between a first transmission of the uplink communication and a last transmission of the uplink communication.

Aspect 34: The method of aspect 30, wherein the particular uplink repetition from which the new beam ready time is measured is indicated via at least one of radio resource control signaling, a medium access control control element, or DCI.

Aspect 35: An apparatus for wireless communication at a device, comprising a processor; memory coupled with the processor; and instructions stored in the memory and executable by the processor to cause the apparatus to perform the method of one or more aspects of aspects 1-17.

Aspect 36: A device for wireless communication, comprising a memory and one or more processors coupled to the memory, the memory and the one or more processors configured to perform the method of one or more aspects of aspects 1-17.

Aspect 37: An apparatus for wireless communication, comprising at least one means for performing the method of one or more aspects of aspects 1-17.

Aspect 38: A non-transitory computer-readable medium storing code for wireless communication, the code comprising instructions executable by a processor to perform the method of one or more aspects of aspects 1-17.

Aspect 39: A non-transitory computer-readable medium storing a set of instructions for wireless communication, the set of instructions comprising one or more instructions that, when executed by one or more processors of a device, cause the device to perform the method of one or more aspects of aspects 1-17.

Aspect 40: An apparatus for wireless communication at a device, comprising a processor; memory coupled with the processor; and instructions stored in the memory and executable by the processor to cause the apparatus to perform the method of one or more aspects of aspects 17-34.

Aspect 41: A device for wireless communication, comprising a memory and one or more processors coupled to the memory, the memory and the one or more processors configured to perform the method of one or more aspects of aspects 17-34.

Aspect 42: An apparatus for wireless communication, comprising at least one means for performing the method of one or more aspects of aspects 17-34.

Aspect 43: A non-transitory computer-readable medium storing code for wireless communication, the code comprising instructions executable by a processor to perform the method of one or more aspects of aspects 17-34.

Aspect 44: A non-transitory computer-readable medium storing a set of instructions for wireless communication, the set of instructions comprising one or more instructions that, when executed by one or more processors of a device, cause the device to perform the method of one or more aspects of aspects 17-34.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   one or more memories; and
   one or more processors, coupled to the one or more memories, configured to:
      determine a new beam ready time that indicates a time at which a beam is to be ready for use in communicating with a base station,
      wherein the new beam ready time is determined based at least in part on a combination of a plurality of parameters that include a time frame that depends on a numerology of a component carrier associated with the beam, and
      wherein the beam is activated by a beam activation command received by the UE; and
      communicate with the base station using the beam after the new beam ready time.

2. The UE of claim 1, wherein the new beam ready time is determined based at least in part on a determination of whether a beam configuration, associated with the beam, is known to the UE, and wherein the beam configuration is determined to be known to the UE when:
   an activation command for the beam configuration has been received within a particular window of time, and
   a quasi co-location (QCL), spatial reference signal, or synchronization signal block QCL source, associated with the beam configuration, has been detected or reported within the particular window of time.

3. The UE of claim 1, wherein the new beam ready time is determined based at least in part on a determination of whether a transmission configuration indicator (TCI) state, associated with the beam, is known to the UE, and wherein the TCI state is determined to be known to the UE based at least in part on:
   a switch command, associated with the TCI state, being received during a particular period of time from a last transmission of a reference signal resource for beam reporting or measurement for the TCI state,
   at least one measurement report for the TCI state being transmitted,
   the TCI state being detectable during a switching period associated with the TCI state,
   a synchronization signal block, associated with the TCI state, being detectable during the switching period associated with the TCI state, and
   a signal-to-noise ratio, associated with the TCI state, satisfying a threshold.

4. The UE of claim 1, wherein the new beam ready time is determined based at least in part on at least one of:
   a timing between a downlink transmission and an acknowledgment associated with the downlink transmission,
   a time to a first synchronization signal block (SSB) transmission after a medium access control control element command is decoded by the UE,
   an SSB processing time,
   whether a transmission configuration indicator (TCI) state, associated with the beam, is included in an active TCI state list,
   a time for a layer 1 reference signal received power (RSRP) measurement for beam refinement,
   whether a layer 1 RSRP measurement is based on a channel state information reference signal or an SSB, or
   a numerology of a component associated with the beam activation command.

5. The UE of claim 1, wherein the new beam ready time is measured from an end of the beam activation command.

6. The UE of claim 5, wherein the new beam ready time is measured from a particular physical downlink control channel (PDCCH) repetition.

7. The UE of claim 6, wherein the particular PDCCH repetition is one of:
- a first transmission of a PDCCH including the beam activation command;
- a last transmission of the PDCCH including the beam activation command; or
- a transmission of the PDCCH including the beam activation command that is between the first transmission of the PDCCH and the last transmission of the PDCCH.

8. The UE of claim 1, wherein the new beam ready time is measured from an end of an acknowledgment of the beam activation command.

9. The UE of claim 8, wherein the new beam ready time is measured from a particular uplink repetition.

10. The UE of claim 9, wherein the particular uplink repetition is one of:
- a first transmission of an uplink communication including the acknowledgment of the beam activation command;
- a last transmission of the uplink communication including the acknowledgment of the beam activation command; or
- a transmission of the uplink communication including the acknowledgment of the beam activation command that is between the first transmission of the uplink communication and the last transmission of the uplink communication.

11. A base station for wireless communication, comprising:
- one or more memories; and
- one or more processors, coupled to the one or more memories, configured to:
  - determine a new beam ready time that indicates a time at which a beam is to be ready for use in communicating with a user equipment (UE),
  - wherein the new beam ready time is determined based at least in part on a combination of a plurality of parameters that include a time frame that depends on a numerology of a component carrier associated with the beam; and
  - communicate with the UE using the beam after the new beam ready time and after a beam activation command, associated with activating the beam, is transmitted to the UE.

12. The base station of claim 11, wherein the new beam ready time is determined based at least in part on a determination of whether a beam configuration, associated with the beam, is known to the UE, and wherein the beam configuration is determined to be known to the UE when:
- an activation command for the beam configuration has been received within a particular window of time, and
- a quasi co-location (QCL), spatial reference signal, or synchronization signal block QCL source, associated with the beam configuration, has been detected or reported within the particular window of time.

13. The base station of claim 11, wherein the new beam ready time is determined based at least in part on a determination of whether a transmission configuration indicator (TCI) state, associated with the beam, is known to the UE, and wherein the TCI state is determined to be known to the UE based at least in part on:
- a switch command, associated with the TCI state, being received during a particular period of time from a last transmission of a reference signal resource for beam reporting or measurement for the TCI state,
- at least one measurement report for the TCI state being transmitted,
- the TCI state being detectable during a switching period associated with the TCI state,
- a synchronization signal block, associated with the TCI state, being detectable during the switching period associated with the TCI state, and
- a signal-to-noise ratio, associated with the TCI state, satisfying a threshold.

14. The base station of claim 11, wherein the new beam ready time is determined based at least in part on at least one of:
- a timing between a downlink transmission and an acknowledgment associated with the downlink transmission,
- a time to a first synchronization signal block (SSB) transmission after a medium access control control element command is decoded by the UE,
- an SSB processing time,
- whether a transmission configuration indicator (TCI) state, associated with the beam, is included in an active TCI state list,
- a time for a layer 1 reference signal received power (RSRP) measurement for beam refinement,
- whether a layer 1 RSRP measurement is based on a channel state information reference signal or an SSB, or
- a numerology of a component associated with the beam activation command.

15. The base station of claim 11, wherein the new beam ready time is measured from a particular PDCCH repetition.

16. The base station of claim 15, wherein the particular PDCCH repetition is one of:
- a first transmission of a PDCCH including the beam activation command;
- a last transmission of the PDCCH including the beam activation command; or
- a transmission of the PDCCH including the beam activation command that is between the first transmission of the PDCCH and the last transmission of the PDCCH.

17. The base station of claim 11, wherein the new beam ready time is measured from a particular uplink repetition.

18. The base station of claim 17, wherein the particular uplink repetition is one of:
- a first transmission of an uplink communication including an acknowledgment of the beam activation command;
- a last transmission of the uplink communication including the acknowledgment of the beam activation command; or
- a transmission of the uplink communication including the acknowledgment of the beam activation command that is between the first transmission of the uplink communication and the last transmission of the uplink communication.

19. A user equipment (UE) for wireless communication, comprising:
- one or more memories; and
- one or more processors, coupled to the one or more memories, configured to:
  - determine a new beam ready time that indicates a time at which a beam is to be ready for use in communicating with a base station,
  - wherein the beam is activated by a beam activation command received by the UE, and wherein the new beam ready time is measured from an end of an acknowledgment of the beam activation command; and communicate with the base station using the beam after the new beam ready time.

20. The UE of claim 19, wherein the new beam ready time is measured from a particular uplink repetition that is a last transmission of an uplink communication including the acknowledgement of the beam activation command.

* * * * *